United States Patent
Jung et al.

(10) Patent No.: US 9,829,968 B2
(45) Date of Patent: Nov. 28, 2017

(54) ELECTRONIC DEVICE HAVING A CHARGING CIRCUIT

(71) Applicant: Samsung Electronics Co., Ltd., Gyeonggi-do (KR)

(72) Inventors: Kuchul Jung, Seoul (KR); Kisun Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 244 days.

(21) Appl. No.: 14/521,719

(22) Filed: Oct. 23, 2014

(65) Prior Publication Data

US 2015/0126256 A1    May 7, 2015

(30) Foreign Application Priority Data

Nov. 4, 2013    (KR) .................. 10-2013-0133007

(51) Int. Cl.
*H02J 7/00* (2006.01)
*G06F 3/00* (2006.01)
*H02M 3/156* (2006.01)

(52) U.S. Cl.
CPC ............ *G06F 3/005* (2013.01); *H02J 7/0065* (2013.01); *H02M 3/156* (2013.01)

(58) Field of Classification Search
None
See application file for complete search history.

(56) References Cited

U.S. PATENT DOCUMENTS

| | | | | |
|---|---|---|---|---|
| 4,236,107 A * | 11/1980 | Templin | ................ | H02J 7/022 320/140 |
| 8,013,586 B2 * | 9/2011 | Tlaskal | ................ | H02M 1/38 323/282 |
| 8,179,105 B2 * | 5/2012 | Lipcsei | ............. | H02M 3/1588 323/224 |
| 8,493,028 B2 * | 7/2013 | Sutardja | ............. | H02J 7/0014 320/116 |
| 8,493,812 B2 * | 7/2013 | Dengler | ................ | G11C 5/145 365/154 |
| 8,513,913 B2 * | 8/2013 | Dubovsky | ........... | H01M 10/465 320/101 |
| 8,536,840 B2 * | 9/2013 | Walter | ................ | H02J 7/0068 323/223 |
| 8,619,443 B2 * | 12/2013 | Lumsden | ................ | H02M 5/12 363/142 |
| 8,736,231 B2 * | 5/2014 | Sutardja | ............. | H02J 7/0014 320/117 |
| 8,823,272 B2 * | 9/2014 | Trainor | ................ | H02J 9/065 315/200 R |
| 2012/0075896 A1 | 3/2012 | Lumsden | | |
| 2012/0106237 A1 | 5/2012 | Dengler et al. | | |

(Continued)

*Primary Examiner* — Leigh Garbowski
(74) *Attorney, Agent, or Firm* — Cha & Reiter, LLC

(57) ABSTRACT

An electronic device is provided including: An electronic device comprising: a charging circuit including a battery coupled to a first end of an inductor, a first switch coupling a second end of the inductor to ground, and a second switch coupled to the second end of the inductor; and a controller configured to alternately close the first switch and the second switch in accordance with a duty cycle D, and increase a voltage transmitted to at least one system from the battery by using the inductor.

7 Claims, 5 Drawing Sheets

(56) References Cited

U.S. PATENT DOCUMENTS

2013/0147376 A1\* 6/2013 Trainor ................ H02J 9/065
 315/200 R
2014/0210400 A1\* 7/2014 Goncalves ............ H02J 7/0029
 320/107

\* cited by examiner

ELECTRONIC DEVICE HAVING A CHARGING CIRCUIT

CLAIM OF PRIORITY

This application claims the benefit under 35 U.S.C. §119(a) of a Korean patent application filed on Nov. 4, 2013 in the Korean Intellectual Property Office and assigned Serial No. 10-2013-0133007, the entire disclosure of which is hereby incorporated by reference.

TECHNICAL FIELD

The present invention relates to a portable electronic device having a charging circuit for a voltage control.

BACKGROUND

A portable electronic device has been highlighted in many fields of an industry and a life since it is small enough to carry while supporting a specific user function. In recent years, a portable electronic device integrally supporting various user functions has been appeared. Accordingly, a configuration of portable electronic device has been added, and a performance of central processing unit (CPU) of the portable electronic device has been improved in order to control the added configuration.

On the other hand, as the performance of CPU of the portable electronic device is improved, an electric power load of CPU is increased, and accordingly, a magnitude of a battery voltage drop of the portable electronic device is also increased. In addition when a battery voltage drops, a voltage, which is required for operation of a system such as an embedded Multi-Media Card (eMMC) and a CPU, may not be supplied.

SUMMARY

According to one aspect of the disclosure, an electronic device is provided comprising: a charging circuit including a battery coupled to a first end of an inductor, a first switch coupling a second end of the inductor to ground, and a second switch coupled to the second end of the inductor; and a controller configured to alternately close the first switch and the second switch in accordance with a duty cycle D, wherein the duty cycle D is selected by the controller in accordance with a current state of the electronic device.

BRIEF DESCRIPTION OF THE DRAWINGS

The above features and advantages of the present invention will be more apparent from the following detailed description in conjunction with the accompanying drawings, in which.

DETAILED DESCRIPTION

The examples provided throughout the disclosure are described with reference to the accompanying drawings. The same reference numbers are used throughout the drawings to refer to the same or like parts. Detailed description of well-known functions and structures incorporated herein may be omitted to avoid obscuring subject matter considered more pertinent.

For example, and without limitation, the phrase "normal mode" may refer to a state of an electronic device in which a first non-removable component of the electronic device is powered by a battery of the electronic device. For example, and without limitation, the phrase "charging mode" may refer to a state of the electronic device in which the first component of the electronic device is powered by a charging adapter (e.g., a travel adapter (TA) or any other suitable type of power supply that plugs into the electric utility grid). For example, and without limitation, the phrase "On-The-Go (OTG) mode" may refer to a state of the electronic device in which a removable device/component is connected to the electronic device. For example, and without limitation, the phrase "flash mode" may refer to a state of the electronic device in which a second non-removable component of the electronic device (e.g., a camera) is turned on or activated (e.g., as opposed to being in standby mode or being powered off).

In some aspects, the first non-removable component may include an embedded Multimedia Card (eMMC), a controller of the electronic device, and or any other suitable type of component. In some aspects, the second non-removable component may include a camera of the device. In some aspects, an electronic device may include any suitable type of device, such as a smart phone, a tablet PC, a digital camera, a computer monitor, a Personal Digital Assistant (PDA), an electronic notebook, a desktop PC, a Portable Multimedia Player (PMP), a media player (e.g., MP3 players), a sound equipment, a wrist watch, a gaming device, and the like. Although the examples of charging circuits disclosed below are provided in the context of a portable electronic device, it will be noted that the same circuits can be used in non-portable devices, as well.

In some aspects, the electronic device may utilize a charging circuit, such as those discussed with respect to FIGS. 1-5, to adaptively control the voltage it draws from its battery. As is illustrated in FIGS. 2-5, the charging circuit may include at least one switch that is coupled to a battery of the electronic device via an inductor. Depending on what mode the portable electronic device is, the electronic device may either increase or decrease the voltage drawn from the battery to different levels by adjusting a duty cycle of the switch. For example, and without limitation, the term "duty cycle" may refer to a proportion of a given period during which the switch is closed.

Figure 1:
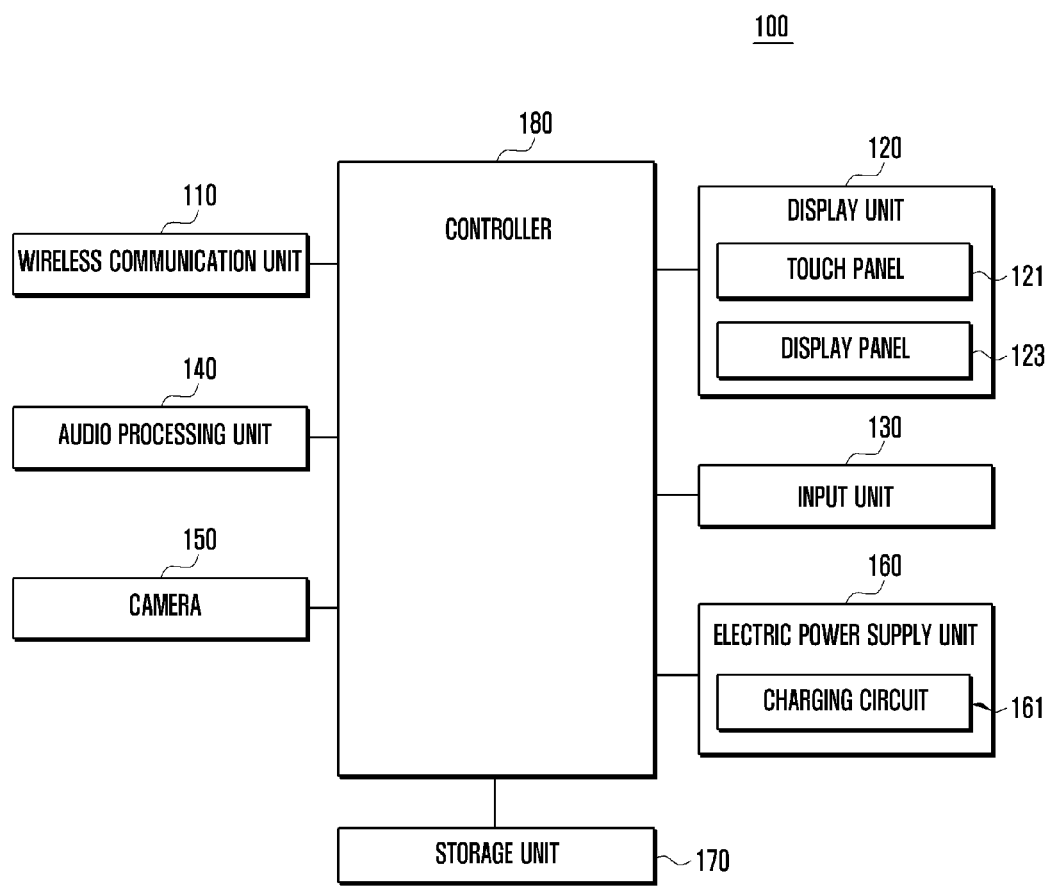
FIG. 1 is a block diagram of an example portable electronic device 100, according to aspects of the disclosure.

FIG. 1 is a block diagram of an example portable electronic device 100, according to aspects of the disclosure. As illustrated, the portable electronic device 100 may include a wireless communication unit 110, a display unit 120, an input unit 130, an audio processing unit 140, a camera 150, an electric power supply unit 160, a storage unit 170, and a controller 180.

The wireless communication unit 110 may form an established communication channel with a supportable network (mobile communication network) under the control of the controller 180, and transmit and receive a signal related with a wireless communication such as a voice communication, and a video communication, and a message service-based data communication such as Short Message Service (SMS), Multimedia Messaging Service (MMS), and Internet. Further, the wireless communication unit 110 may include a transceiver for up-converting and amplifying a frequency of a transmitted signal, and low-noise amplifying and down-converting a frequency of a received signal. In an embodiment of the present invention, a high electric power may be consumed when the wireless communication unit 110 up-converts and amplifies the frequency of a signal so as to transmit a signal, and accordingly, an increased voltage can be supplied from the electric power supply unit 160 under control of the controller 180.

The display unit 120 may provide various screens necessary for operation of the portable electronic device 100. For example, the display unit 120 may support a standby screen, a menu screen, and the like necessary for operation of the portable electronic device 100. Such display unit 120 may include a touch panel 121 and a display panel 123. The touch panel 121 may be implemented with an add-on type which locates on the display panel 123 and an on-cell type or in-cell type which is inserted into the display panel 123.

The touch panel 121 may generate a touch event in response to a gesture of user for the screen, and analog-to-digital (AD) convert the touch event to transmit to the control unit 180. Such touch panel 121 may be a complex touch panel configured to include a hand touch panel detecting a hand gesture and a pen touch panel detecting a pen gesture. Here, the hand touch panel may be implemented with a capacitive type. Furthermore, the hand touch panel may also be implemented with a resistive type, an infrared type or an ultrasound type.

The display panel 123 may display data on the screen under control of the controller 180. That is, when the control unit 180 processes (e.g., decoding) the data to store in a buffer, the display panel 123 may convert the data stored in the buffer into an analog signal to display on the screen. In addition, the display panel 123 may be configured by a Liquid Crystal Display device (LCD), an Active Matrix Organic Light Emitted Diode (AMOLED), Passive Matrix Organic Light Emitted Diode (PMOLED), Flexible display, or a transparent display.

The input unit 130 may transmit a signal for operation of portable electronic device to the controller 180 in addition to a key event generated from the user input. The controller 180 may control a corresponding configuration in response to such a signal.

The audio processing unit 140 may include a codec, and the codec may be configured with a data codec for processing a packet data and an audio codec for processing an audio signal such as a voice. The audio processing unit 140 may convert a digital audio signal into an analog audio signal through the audio codec to output through a receiver (RCV) or a speaker (SPK), and may convert an analog audio signal input from a microphone (MIC) into a digital audio signal through the audio codec.

The camera 150 may photograph an image to receive a data signal, and transmit the received data signal to the controller. In an embodiment of the present invention, when the camera unit 150 is operating, that is, in the flash mode, the portable electronic device 100 may consume more electric power compared to the normal mode. Accordingly, the controller 180 may control to supply the increased voltage to the camera 150 in the flash mode.

The electric power supply unit 160 may supply electric power to each element of the portable electronic device 100. The portable electronic device 100 according to an embodiment of the present invention may include a charging circuit 161, and may control to supply the increased or decreased voltage to a system adaptively through the charging circuit 161 in the normal mode, the charging mode, the On-The-Go (OTG) mode, and the flash mode. The operation of charging circuit 161 will be described later in detail.

The storage unit 170 may include a hard disk (HD), a random access memory (RAM), a flash memory, and/or any other suitable type of volatile or non-volatile memory. The storage unit 170 may store data generated in the portable electronic device 100 or received from an external device (another device) such as a server, a desktop PC, etc. through the wireless communication unit 110 or an external interface unit (not shown) under the control of the controller 180.

Further, the storage unit 170 may store an operating system (OS) for operation of the portable electronic device 100, and an application program necessary for other options function such as a sound play function, an image or a video play function, and a broadcast play function as well as a user data and a data transmitted and received at the time of communication.

The controller 180 may include any suitable type of processing circuitry, such as a processor (e.g., an ARM-based processor), a Field Programmable Gate Array (FPGA), or an Application-Specific Integrated Circuit (ASIC). In some implementations, the controller 180 may control an overall operation of the portable electronic device 100 and a signal flow between internal configurations of the portable electronic device 100, and may perform a data processing function.

In one aspect, the controller 180 may adaptively control a voltage supplied to and from a battery of the electronic device 100. For example, while the portable device 100 is in the normal mode, the controller may increase the voltage that is supplied from the battery to one or more elements of the electronic device 100. As another example, while the portable electronic device 100 is in the charging mode, the controller 180 may decrease the voltage supplied by a travel adapter (TA) to the battery. As yet another example, when the electronic device is in the OTG mode or in the flash mode, the controller 180 may increase a voltage supplied by the battery to one or more elements of the electronic device.

In another aspect, the controller may control the operation of a charging circuit, such as the charging circuits depicted in FIG. 2-5, by generating one or more signals that cause different switches in the charging circuit to open and close. In some implementations, the signals may be generated periodically.

Although not shown in FIG. 1, the portable electronic device 100 may further include a Electric power Management Integrated Circuit (PMIC) for managing electric power and a battery fuel gauge for measuring a remaining charge, a voltage, a current, and a temperature of battery.

Figure 2:
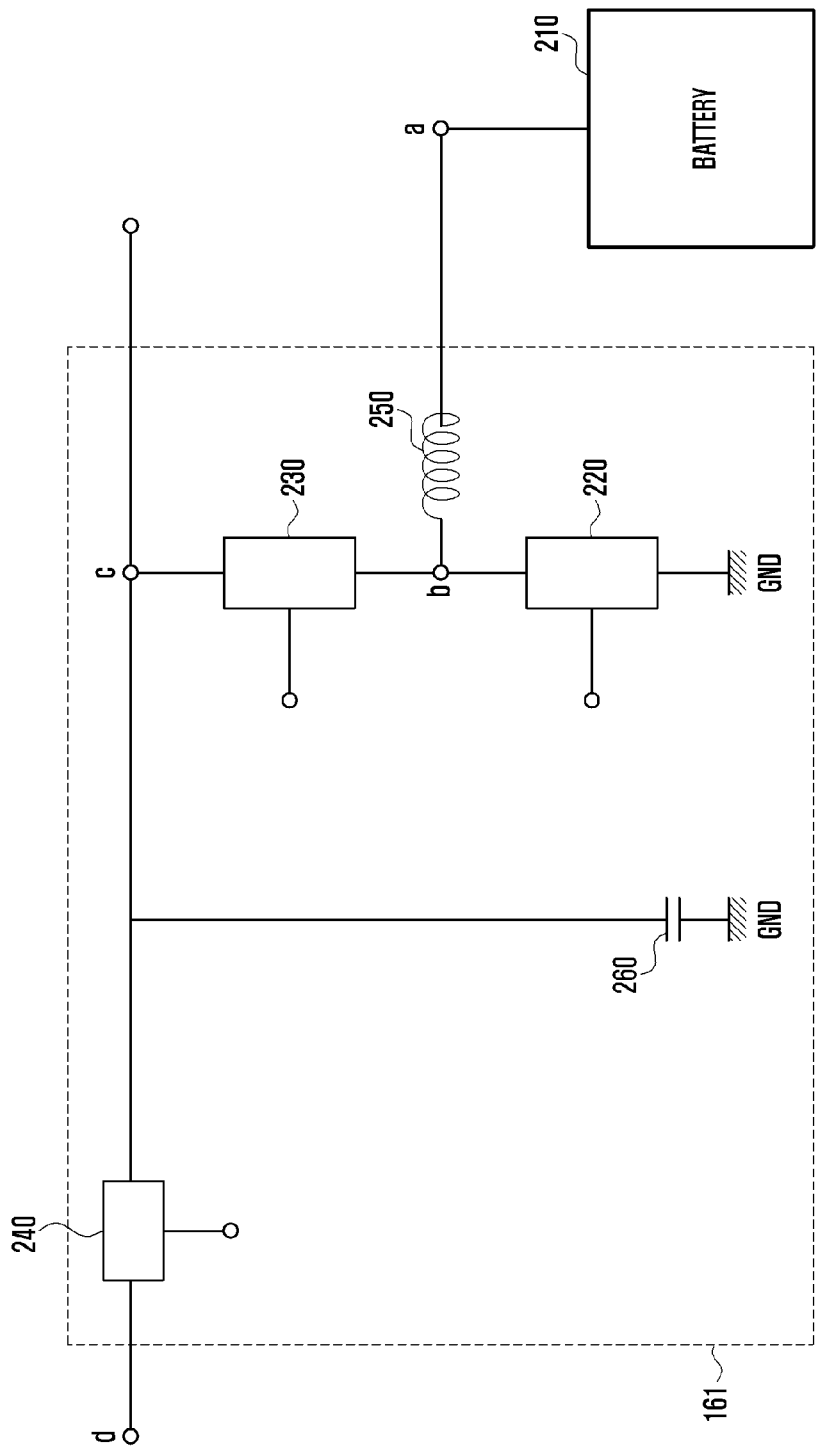
FIG. 2 is a diagram illustrating an example of a charging circuit, according to aspects of the disclosure.

FIG. 2 is a diagram illustrating an example of a charging circuit, according to aspects of the disclosure. The charging circuit may include a first switch 220, a second switch 230, a third switch 240, an inductor 250, and a capacitor 260.

Each of the first switch 220 and the second switch 230 may be opened and closed by the controller 180. In some aspects, while the portable electronic device 100 is in the normal mode, the first switch 220 and the second switch 230, in conjunction with the inductor 250, may increase a voltage supplied from the battery. In some aspects, while the portable electronic device 100 is in the charging mode, the first switch 220 and the second switch 230, in conjunction with the inductor 250, may decrease a voltage supplied from a charging adapter to a battery 210. As shown in FIG. 2, the battery 210 and the inductor 250 may be serially connected through node a, while being connected in parallel with the first switch 220 and the second switch 230 through node b.

The first switch 220 and the second switch 230 may be serially connected to one another through node b.

In some aspects, the controller may also open and close the third switch 240. For example, the controller may close the third switch 240, when the electronic device is in the charging mode or the OTG mode. As another example, the controller may open the third switch 240, when the electronic device is in the normal mode or the flash mode. As illustrated, the third switch 240 may be connected in parallel with the second switch 230 and the capacitor 260 through node c. Furthermore, the third switch 240 may be connected with a charging adapter or an external device through node d.

In some aspects, each of the first switch 220, the second switch 230, and the third switch 240 may be a Metal Oxide Semiconductor Field Effect Transistor (MOSFET) device. However, any of the first switch 220, the second switch 230, and the third switch 240 may be implemented using any suitable type of device that is capable of switching, such as a Bipolar Junction Transistor (BJT), a for example.

In some aspects, the inductor 250 may be arranged to store or discharge energy received from the battery 210 or a charging adapter. The capacitor 260 may be used to stabilize the voltage at node c.

Figure 3:
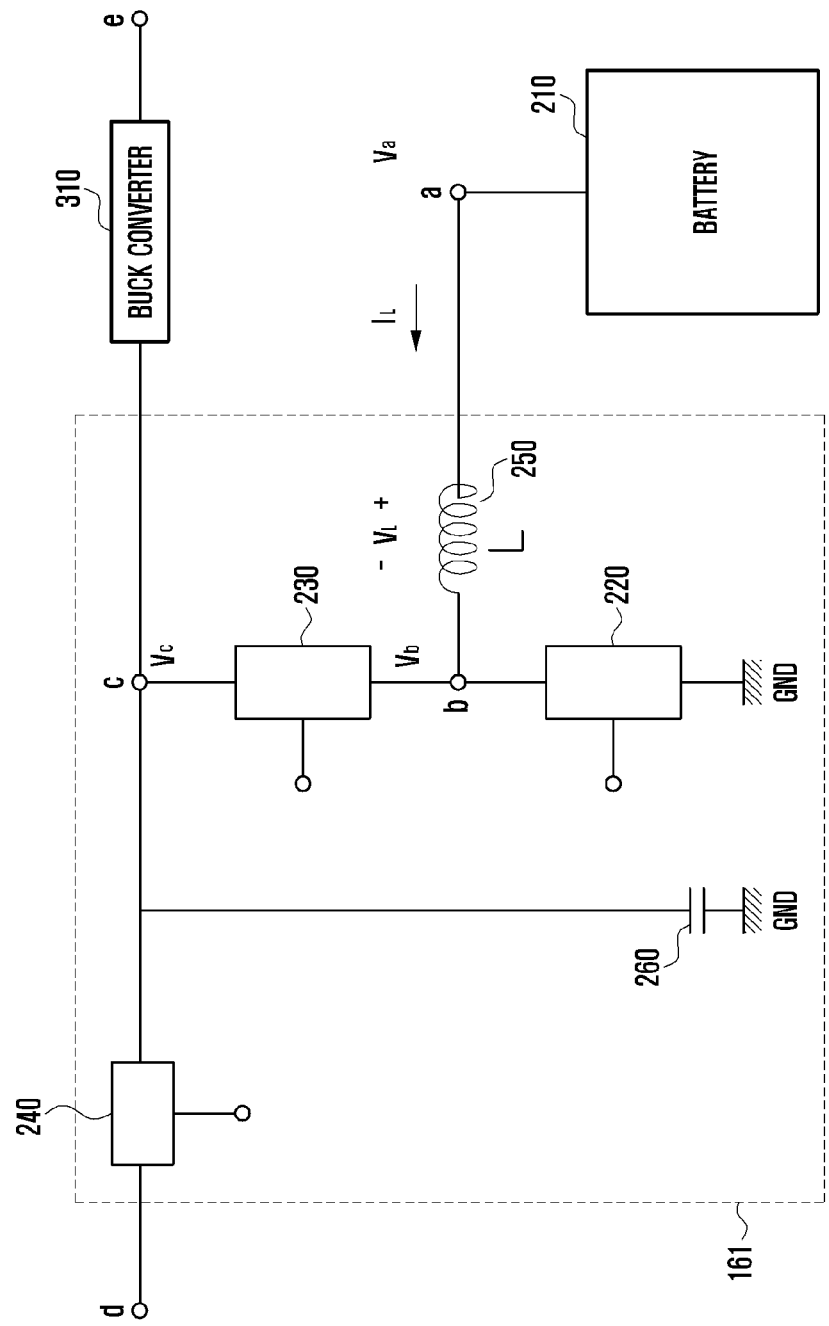
FIG. 3 is a diagram illustrating an example of a charging circuit, according to aspects of the disclosure.

FIG. 3 is a diagram illustrating an example of a charging circuit, according to aspects of the disclosure. The charging circuit may include a buck converter 310. The buck converter 310 may rectify a direct current voltage input. The buck converter may be connected with the second switch 230 through node c, and may feed the rectified voltage to one or more components of the electronic device 100 (e.g., the controller 180) through node e. In the normal mode, when a current $I_L$ is supplied from the battery 210 under the control of the controller 180, energy may be stored in the inductor 250. The inductor 250 may have inductance L. The relationship between the energy stored in the inductor 250 and the voltage $V_L$ of the inductor 250, (e.g., the voltage between node a and node b) can be represented by Equation 1:

$$E = 1/2 \cdot (L) \cdot (I_L)^2.$$
$$V_L = L \cdot \frac{dIL}{dt}$$

(Equation 1)

wherein E is the energy stored in the inductor 250, L is inductance of the inductor, $V_L$ is a voltage of the inductor 250, and $I_L$ is a current in the inductor 250.

In operation, the controller 180 may generate one or more control signals causing the first switch 220 and the second switch 230 to open and close in accordance with a predetermined duty cycle. The duty cycle may include the proportion of a period T for which a respective one of the first switch and the second switch is closed while the other one is open. More specifically, the controller 180 may alternately close the first switch 220 and the second switch 230, such that: (1) the first switch 220 is closed when the second switch 230 is opened, and (2) the first switch 220 is opened when the second switch 230 is closed. Thus, when a duty cycle D is used as a basis for the alternate closing of the first switch 220 and the second switch 230, in every given period T, the first switch 220 may be maintained by the processor in a closed state while the second switch 230 is open for a duration DT and the second switch 230 may be maintained in closed state while the first switch 220 is open for the rest of the period (i.e., for a duration (1−D)T). In some implementations, D may be less than one (1) and greater than zero (0).

When the first switch 220 is closed and the second switch 230 is opened, current $I_L$ may flow in a closed circuit which connects from the battery to node a, the inductor 250, node b, and the ground GND. Since there is no load in this circuit, current may begin accumulating in the inductor 250. The change of the current $I_L$ stored in the inductor 250 during the duration DT can be represented by Equation 2 below:

$$\Delta I_L = 1/L \cdot \int_0^{DT}(Va-Vb)dt = 1/L \cdot \int_0^{DT}(Va)dt = 1/L \cdot (Va) \cdot DT \quad \text{(Equation 2)}$$

wherein, $\Delta I_L$ is change of the current $I_L$, L is an inductance of the inductor 250, Va is a voltage of the node a, Vb is a voltage of the node b, DT is the duration in each period T for which the first switch is closed while the second switch is open. It should be noted that Equation 2 assumes that the value of Vb is negligible.

In addition, for duration (1−D)T in each period T, the first switch 220 may be opened while the second switch 230 is closed. The current $I_L$ may flow to a circuit which connects the battery 210, node a, the inductor 250, node b, the second switch 230, node c, the buck converter 310, and node e. Since electric power is consumed in the electronic device, over duration (1−D)T, the current $I_L$ stored in the inductor 250 may be discharged. The change in the current $I_L$ can be represented by Equation 3, as follows:

$$\begin{aligned}\Delta I_L &= 1/L \cdot \int_{DT}^{1}(Va-Vb)\,dt \\ &= 1/L \cdot \int_{DT}^{1}(Va-Vc)\,dt \\ &= 1/L \cdot (\underline{Va}-\underline{Vc}) \cdot (1-D)T.\end{aligned}$$

(Equation 3)

wherein, $\Delta I_L$ is change of the current $I_L$, L is an inductance of the inductor 250, Va is a voltage of the node a, Vb is a voltage of the node b, Vc is a voltage of the node c, (1−D)T is the duration in each period T for which the second switch is closed while the first switch is open. Equation 3 assumes that the degree of voltage drop in the second switch 230 is small, Vb=Vc.

Further, when the electronic device is in the normal mode, the sum of the change of current $I_L$ in durations DT and (1−D)T may substantially equal zero. Accordingly, Equation 4 may be derived.

$$\frac{Vc}{Va} = \frac{1}{1-D}$$

(Equation 4)

wherein, Va is a voltage of the node a, Vc is a voltage of the node c, and D is the duty ratio of the closing of the first switch 220 on during one period T.

Since 0≤D≤1 in Equation 4, and Va≤Vc, the controller 180 may alternately close the first switch 220 and the second switch 230 in accordance with the duty cycle D, to increase the voltage at node c.

Figure 4:
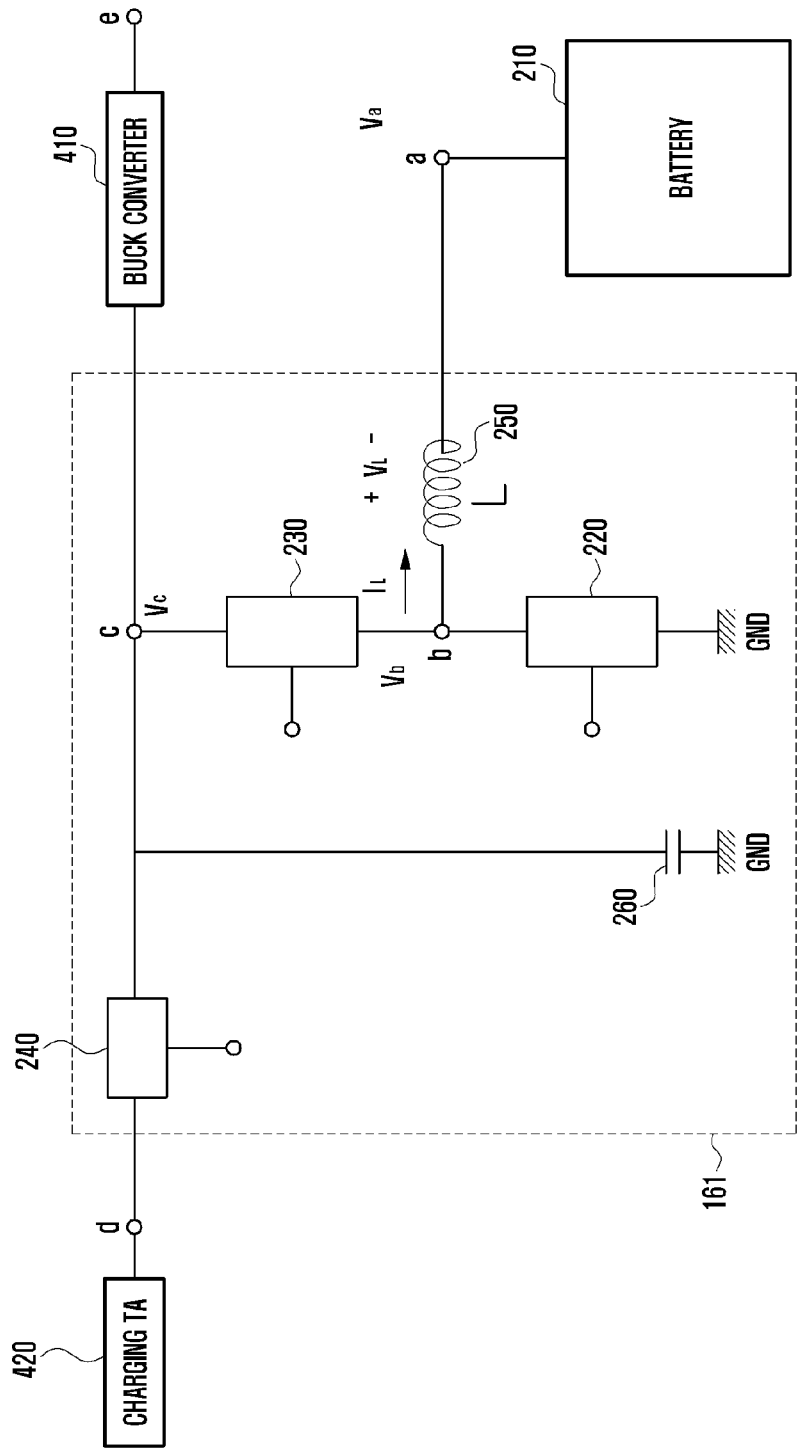
FIG. 4 is a diagram illustrating an example of a charging circuit, according to aspects of the disclosure.

FIG. 4 is a diagram illustrating an example of a charging circuit, according to aspects of the disclosure. In this example, current is supplied by a Travel Adapter (TA) 420. The current may be fed by the depicted charging circuit to one or more elements of the electronic device 100 (e.g., controller, eMMC, etc.) via the buck converter 410. Additionally or alternatively, the current may be supplied to the battery 210 via the second switch 230 and the inductor 250. When TA 420 is connected to the charging circuit through node d, the controller 180 may detect that a connection with TA 420 is established. For example, the controller may receive a signal from the TA 420 or may recognize the connection of the TA 420 by detecting a current change (e.g., by using a current sensor (not shown)).

In response to detecting that TA 420 is connected, the controller may generate a control signal causing the third switch 240 to close. When the third switch 240 becomes closed, a voltage may be fed from TA 420 to node c. Assuming that the voltage drop of the third switch 240 is small, the voltage between at node d may be identical to the voltage at node c. Then, the controller 180 may use the second switch 230 and the inductor 250 to cause the voltage at node a to be lower than the voltage at node c In some implementations, the controller may alternately close the first switch 220 and the second switch 230 in in accordance with a duty cycle D. In other words, in each period T, the controller 180 may cause the second switch 230 to be opened while the first switch 220 is closed for duration DT, and may cause the first switch 220 to be closed while the second switch 230 is opened for duration (1−D)T. The change in the current stored in the inductor 250 during the portion DT of period T can be represented by Equation 5, as follows.

$$\Delta I_L = 1/L \cdot \int_0^{DT}(Vb-Va)dt = 1/L \cdot \int_0^{DT}(-Va)dt = 1/L \cdot (Va) \cdot DT \quad \text{(Equation 5)}$$

wherein, $\Delta I_L$ is change of the current $I_L$, L is an inductance of the inductor 250, Va is a voltage of the node a, Vb is a voltage of the node b, and DT is the portion of each period T in which the first switch 220 is closed while the second switch 230 is open. Equation 5 assumes that Va is negligible.

In addition, over duration (1-D)T of every period T, the first switch 220 may be opened while the second switch 230 is closed, and the current $I_L$ may flow to the battery 210 from the charging TA 420 through node c, the second switch 230, node b, and the inductor 250. At this time, the amount of current flowing into the battery 210 can be represented by Equation 6, as follows:

$$\Delta I_L = 1/L \cdot \int_{DT}^{T}(Vb-Va)dt = 1/L \cdot \int_{DT}^{T}(Vc-Va)dt = 1/L \cdot (Vc-Va) \cdot (1-D)T \quad \text{(Equation 6)}$$

wherein, $\Delta I_L$ is change of the current $I_L$, L is an inductance of the inductor 250, Va is a voltage of the node a, Vb is a voltage of the node b, and DT is the duration in each period T for which the first switch 220 is closed while the second switch 230 is open. Equation 5 assumes that the voltage drop in the second switch 230 is small and Vb=Vc.

Further, when the electronic device is in a steady state, during each period T, the current stored in the inductor 250 in duration DT of each period T may equal to the current discharged from the inductor 250 in the duration (1−D)T of each period T. Accordingly, Equation 7 may be derived.

$$\frac{Vc}{Va} = \frac{1-2D}{1-D} \quad \text{(Equation 7)}$$

wherein Va is a voltage of the node a, Vc is a voltage of the node c, and D is the duty cycle in accordance with which the first switch and the second switch are alternately closed. Since $0 \leq D \leq 1$ in Equation 7, $Vc \leq Va$, and the voltage at node a may be decreased compared to the voltage at node c.

Figure 5:
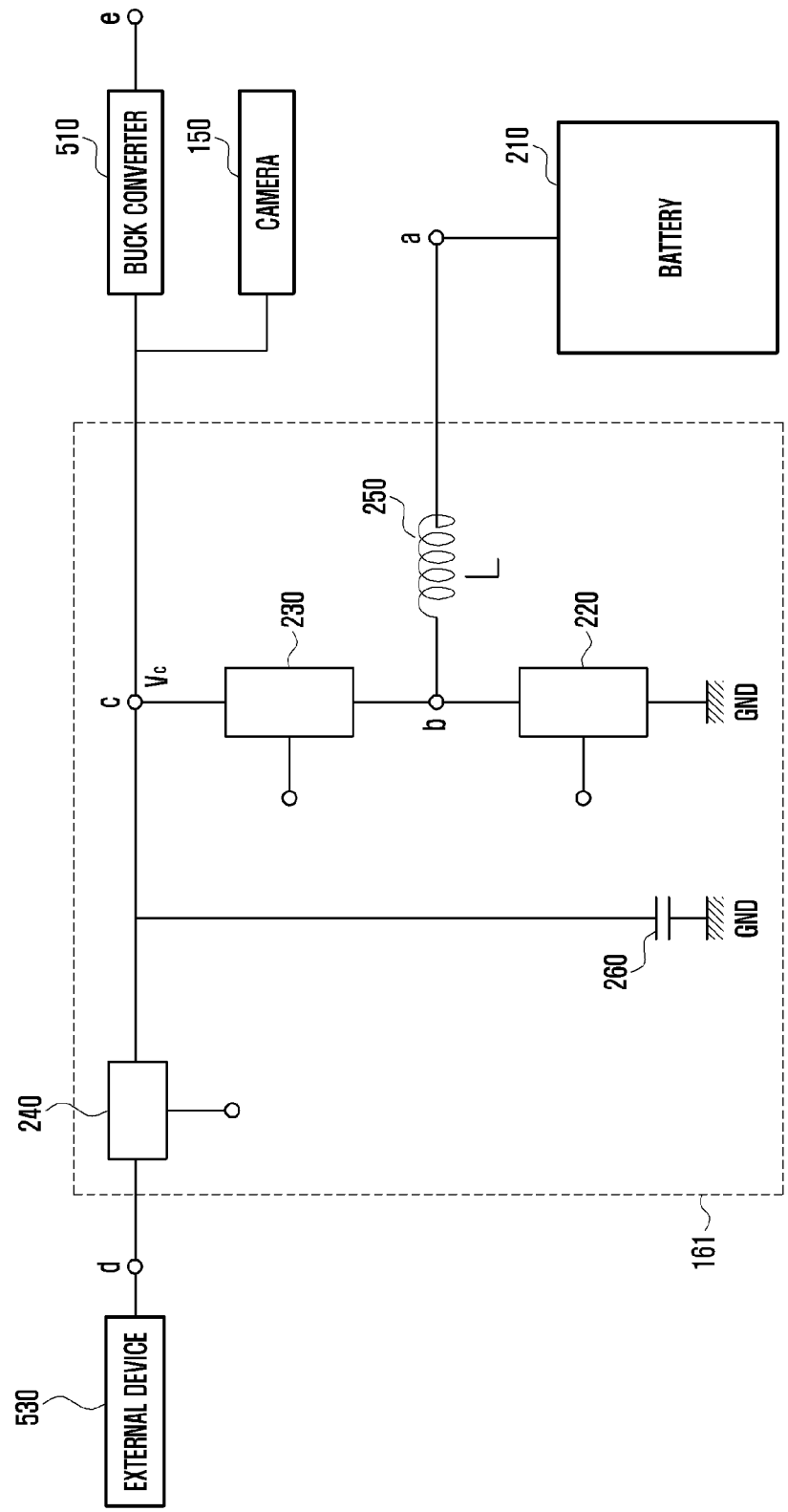
FIG. 5 is a diagram illustrating an example of a charging circuit, according to aspects of the disclosure.

FIG. 5 is a diagram illustrating an example of a charging circuit, according to aspects of the disclosure.

When the electronic device 100 is in the OTG mode, the controller 180 may generate a signal closing the third switch 240. After the third switch 240 is closed, electric power may be supplied to an external device 530 from the battery 210 through node a, the inductor 250, node b, the second switch 230, node c, the third switch 240, and node d. The controller 180 may control the first switch 220, the second switch 230, and third switch 240 to feed voltage from the battery 210 to an external device in the OTG mode. The controller 180 may alternately close the first and second switches, to cause increased voltage to be fed from the battery 210 to the external device 530 via node c. The voltage is increased relatively to the voltage level at node a.

When the electronic device is in the flash mode, the controller 180 may feed electric power from the battery 210 to a camera 150 and a buck converter 510 through node a, the inductor 250, node b, the second switch 230, and node c. The controller 180, in the flash mode, may control the first switch 220, the second switch 230, and third switch 240 to feed increased voltage from the battery 210 to the camera 150 and the buck converter 510. The controller 180 may alternately close the first switch and the second switch to cause increased voltage to be fed from the battery 210 to the external device 530 via node c. The voltage is increased relatively to the voltage level at node a. Thus, the portable electronic device 100 use one of the charging circuits discussed with respect to FIGS. 1-5 to adaptively control a voltage of the portable electronic device 100 in the normal mode.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although various examples have been provided throughout the disclosure, it should be clearly understood that many variations and modifications of the basic inventive concepts herein taught which may appear to those skilled in the present art will still fall within the spirit and scope of the present invention, as defined in the appended claims.

What is claimed is:

1. An electronic device comprising:
a charging circuit including a battery coupled to a first end of an inductor, a first switch coupling a second end of the inductor and a ground, a second switch coupling the second end of the inductor and a first terminal, and a third switch coupling the first terminal and a second terminal connected with an external device;
a buck converter electrically connected to the first terminal configured to:
drop a voltage of the first terminal, and
provide the dropped voltage to at least one component of the electronic device as an operating voltage; and
a controller configured to:
generate control signals to control the first switch and the second switch,
control the first switch and the second switch so that the first switch and the second switch are alternately closed to increase a voltage to be transmitted to the first terminal from the battery by using the inductor,
receive, from the external device, a signal associated with a connection between the external device and the second terminal when the electronic device is connected with the external device through the second terminal;
generate a control signal to control the third switch to be turned on when the second terminal is connected with the external device,
wherein the controller is electrically connected to the first switch, the second switch and the third switch.

2. The electronic device of claim 1, wherein each of the first switch and the second switch includes a Metal Oxide Semiconductor Field Effect Transistor (MOSFET) device.

3. The electronic device of claim 1, wherein the charging circuit further comprises a capacitor coupling the first terminal and the ground to stabilize the voltage supplied from the battery.

4. The electronic device of claim 1, further comprising a camera,
wherein the camera is electrically connected to the first terminal and configured to transmit a signal related to operating of the camera to the controller,
wherein the controller is configured to receive the signal related to operating of the camera and transmit the increased voltage to the camera when the camera operates.

5. The electronic device of claim 1, wherein the external device includes a charging Travel Adapter (TA),
wherein the controller is configured to:
receive, from a charging Travel Adapter (TA), a signal associated with a connection between the charging TA and the second terminal;
control the third switch to be turned on; and
control the first switch and the second switch so that the first switch and the second switch are alternately closed to decrease a voltage to be transmitted to the battery from the first terminal, when the second terminal is connected to the charging TA.

6. The electronic device of claim 5, wherein the controller is configured to control the first switch and the second switch to be mutually inversely turned on or off so as to decrease the voltage transmitted from the charging TA.

7. The electronic device of claim 5, further comprising a camera,
wherein the camera is electrically connected to the first terminal and configured to transmit a signal related to operating of the camera to the controller, and
wherein the controller is configured to receive the signal related to operating of the camera and transmit the voltage transmitted from the charging TA to the camera when the camera operates.

* * * * *